United States Patent
Geller

(10) Patent No.: US 10,343,684 B2
(45) Date of Patent: Jul. 9, 2019

(54) SYSTEMS AND METHODS FOR SMOOTH STOPPING OF A VEHICLE

(71) Applicant: Toyota Motor Engineering & Manufacturing North America, Inc., Erlanger, KY (US)

(72) Inventor: Benjamin M. Geller, Hermosa Beach, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 465 days.

(21) Appl. No.: 15/085,152

(22) Filed: Mar. 30, 2016

(65) Prior Publication Data

US 2017/0282925 A1    Oct. 5, 2017

(51) Int. Cl.
*B60W 30/18* (2012.01)
*B60T 8/171* (2006.01)
(Continued)

(52) U.S. Cl.
CPC ....... *B60W 30/18109* (2013.01); *B60T 8/171* (2013.01); *B60T 8/3255* (2013.01); *B60W 10/08* (2013.01); *B60W 10/184* (2013.01); *B60W 30/181* (2013.01); *B60T 2220/04* (2013.01); *B60T 2230/04* (2013.01); *B60T 2250/04* (2013.01); *B60T 2260/09* (2013.01); *B60W 2520/10* (2013.01); *B60W 2520/105* (2013.01);
(Continued)

(58) Field of Classification Search
CPC ........... B60W 30/18109; B60W 30/20; B60W 10/08; B60W 10/184; B60W 2520/10; B60W 2520/26; B60W 2540/10; B60W 2540/12; B60W 2710/08; B60W 2710/18; B60W 30/181; B60W 2530/10; B60T 8/171; B60T 8/17555; B60T 8/321; B60T 8/3255; B60T 2220/04; B60T 2230/04; B60T 2250/04; B60T 2260/09
See application file for complete search history.

(56) References Cited

U.S. PATENT DOCUMENTS 4,254,998 A   3/1981   Marshall et al.
4,368,501 A   1/1983   Gingrich
(Continued)

FOREIGN PATENT DOCUMENTS

EP       1781516        6/2010
WO    WO 2008/071577   6/2008

*Primary Examiner* — Charles A Fox
*Assistant Examiner* — Lori Wu
(74) *Attorney, Agent, or Firm* — Snell & Wilmer LLP

(57) ABSTRACT

A system includes a sensor designed to detect data corresponding to a speed of a vehicle and a motor designed to convert electrical energy into driving torque. The system also includes a first wheel coupled to the motor and designed to propel the vehicle in response to receiving the driving torque along with a second wheel. The system also includes a brake coupled to at least one of the first wheel or the second wheel and designed to apply a braking torque to the at least one of the first wheel or the second wheel. The system also includes an ECU coupled to the sensor and the motor and designed to control the motor to begin controlled braking by applying the driving torque to the first wheel to at least partially offset the braking torque when the speed of the vehicle is at or below a braking threshold speed.

20 Claims, 5 Drawing Sheets

(51) Int. Cl.
  *B60W 10/08* (2006.01)
  *B60W 10/184* (2012.01)
  *B60T 8/32* (2006.01)

(52) U.S. Cl.
  CPC ..... *B60W 2520/26* (2013.01); *B60W 2530/10* (2013.01); *B60W 2540/10* (2013.01); *B60W 2540/12* (2013.01); *B60W 2550/142* (2013.01); *B60W 2710/083* (2013.01); *B60W 2710/18* (2013.01); *Y10S 903/903* (2013.01); *Y10S 903/947* (2013.01)

(56) References Cited

U.S. PATENT DOCUMENTS

| | | |
|---|---|---|
| 5,923,093 A | 7/1999 | Tabata et al. |
| 6,007,160 A | 12/1999 | Lubbers et al. |
| 6,254,197 B1 | 7/2001 | Lading et al. |
| 6,280,002 B1 | 8/2001 | Goodzey et al. |
| 6,890,041 B1 | 5/2005 | Ribbens et al. |
| 7,197,383 B2 | 3/2007 | Tobler et al. |
| 7,439,695 B2 | 10/2008 | Ngo et al. |
| 8,388,071 B2 | 3/2013 | Yokoyama et al. |
| 8,596,390 B2 | 12/2013 | Soliman et al. |
| 2006/0025905 A1* | 2/2006 | Zhao ...................... B60K 6/445 701/22 |
| 2007/0132311 A1 | 6/2007 | Giazotto |
| 2007/0199745 A1* | 8/2007 | Hayashi ................... B60K 6/48 180/65.28 |
| 2012/0173060 A1 | 7/2012 | Sujan et al. |
| 2014/0188317 A1* | 7/2014 | Jung ............... B60W 30/18109 701/22 |
| 2015/0239475 A1* | 8/2015 | Bayar ................... B60K 6/365 701/22 |
| 2016/0129810 A1* | 5/2016 | Takahashi ........... B60L 15/2036 701/22 |
| 2018/0043792 A1* | 2/2018 | Sawada ................... B60L 15/20 |

* cited by examiner

SYSTEMS AND METHODS FOR SMOOTH STOPPING OF A VEHICLE

BACKGROUND

Field

The present disclosure relates to systems and methods for controlling braking operations of a vehicle to provide a smooth vehicle stop.

Description of the Related Art

Many vehicles, especially vehicles that use rubber tires, tend to oscillate upon coming to a stop during a braking event. A vehicle has forward momentum as it decelerates to a stop. When the vehicle comes to a complete stop (i.e., the vehicle speed reaches 0 miles per hour (mph)), the vehicle still has this forward momentum.

Immediately after stopping, the forward momentum creates a force on the tires, causing them to deform. This deformation allows the vehicle to move forward relative to the tires. When the forward momentum of the vehicle has ceased, the resiliency of the tires causes them to reform, thus pulling the vehicle in an aft direction (i.e., towards the back of the vehicle). This aftward movement of the vehicle creates momentum in the aft direction. The aftward momentum causes the tires to deform and allow the vehicle to move aft relative to the tires. The resiliency of the tires again causes them to reform, pulling the vehicle in the forward direction, and so forth. This process keeps repeating such that the vehicle oscillates aftward and forward until all of the momentum of the vehicle has dissipated.

This oscillation of the vehicle upon stopping may be undesirable as it can be unpleasant to the driver and passengers. While some individuals may not notice this movement, it occurs and is unpleasant to other individuals. The oscillation may further be undesirable as it can reduce the life expectancy of vehicle tires and other vehicle parts. For example, the constant deformation of the tires may cause them to lose some structural integrity which can result in the tires wearing out prematurely.

Thus, there is a need for systems and methods for reducing vehicle oscillations during a vehicle stop.

SUMMARY

Described herein are exemplary systems and methods for reducing oscillations of a vehicle when the vehicle comes to a stop. An exemplary system for reducing oscillations when a vehicle is braking includes a sensor designed to detect data corresponding to a speed of the vehicle. The system also includes a motor designed to convert electrical energy into driving torque. The system also includes a first wheel and a second wheel such that at least the first wheel is coupled to the motor and designed to propel the vehicle in response to receiving the driving torque. The system also includes a brake coupled to at least one of the first wheel or the second wheel and designed to apply a braking torque to the at least one of the first wheel or the second wheel to reduce the speed of the vehicle. The system also includes an electronic control unit (ECU) coupled to the sensor and the motor and designed to control the motor to begin controlled braking by applying the driving torque to the first wheel to at least partially offset the braking torque when the speed of the vehicle is at or below a braking threshold speed.

Also described is a system for reducing oscillations when a vehicle is braking. The system includes a sensor configured to detect data corresponding to a speed of the vehicle. The system also includes a first wheel and a second wheel such that at least the first wheel is designed to propel the vehicle in response to receiving driving torque. The system also includes a brake coupled to at least one of the first wheel or the second wheel and configured to apply a braking torque to the at least one of the first wheel or the second wheel to reduce the speed of the vehicle. The system also includes an electronic control unit (ECU) coupled to the sensor and the brake. The ECU can control the brake to begin controlled braking by reducing the braking torque applied to the at least one of the first wheel or the second wheel when the speed of the vehicle is at or below a braking threshold speed.

Also described is a method for reducing oscillations when a vehicle is braking. The method includes detecting, by a sensor, data corresponding to a speed of the vehicle. The method also includes determining, by an electronic control unit (ECU), that controlled braking should begin when the speed of the vehicle is at or below a braking threshold speed. The method also includes controlling, by the ECU, a vehicle component to reduce or offset an amount of braking torque of the vehicle when controlled braking should begin.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Described herein are systems and methods for increasing the smoothness of a vehicle stop. The systems and methods provide several benefits and advantages. For example, the systems provide the benefit and advantage of reducing oscillations when the vehicle comes to a stop. The reduced oscillations increase driver and passenger comfort because they may not be noticeable. The systems and methods provide further benefits and advantages such as causing the vehicle to come to a more gradual and smoother stop. Causing the vehicle to come to a more gradual and smoother stop provides the benefit and advantage of further increasing driver and passenger comfort. The systems provide further benefits and advantages such as reducing tire deformations during vehicle stop events. This provides benefits and advantages such as increasing a lifespan of vehicle tires and other vehicle parts.

An exemplary system includes wheels and a motor. The motor is coupled to the wheels and designed to provide driving torque to the wheels to cause a vehicle to move in the forward direction. The system also includes one or more brakes. The brakes are coupled to one or more wheels and are designed to apply a braking torque to the one or more wheels for decelerating the vehicle. The system also includes a sensor designed to detect data corresponding to a vehicle speed. The system further includes an electronic control unit (ECU) coupled to the motor, the brakes and the sensor. The ECU is designed to determine when the speed of the vehicle is at or below a braking threshold speed. When the speed of the vehicle is at or below the braking threshold speed during a braking event, the ECU controls the motor to apply driving torque to the wheels to offset the braking torque. This offset of the braking torque results in decreased vehicle oscillations when the vehicle stops.

Figure 1:
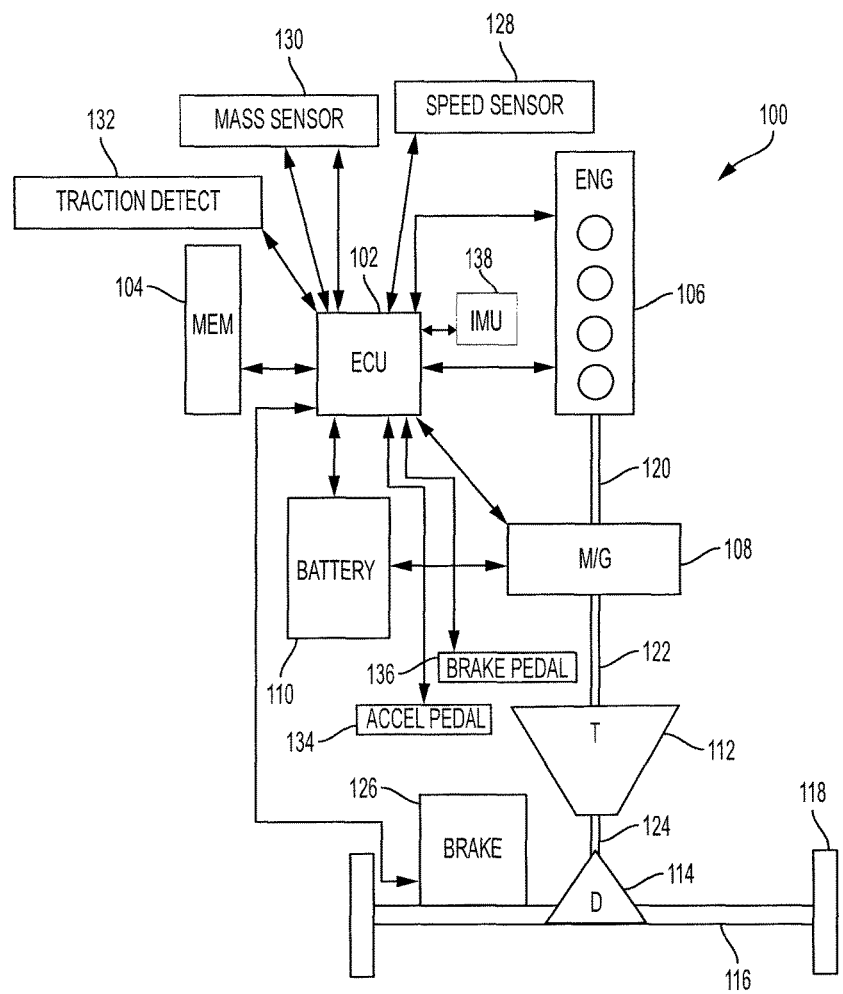
FIG. 1 is a block diagram of a hybrid vehicle having components for controlling braking to reduce oscillations upon a vehicle stop according to an embodiment of the present invention.

Turning to FIG. 1, a hybrid vehicle 100 includes an engine 106, a motor-generator 108, a battery 110, a transmission 112 and a differential 114. The vehicle 100 also includes an ECU 102 and a memory 104, along with a brake 126 and a plurality of sensors including a speed sensor 128, a mass sensor 130 and a traction detection device 132. The vehicle 100 also includes an accelerator pedal 134 and a brake pedal 136.

The engine 106 ignites fuel to generate driving torque. The engine 106 may be a gasoline engine. In some embodiments, the engine 106 may also or instead include any other torque-generating and/or energy conversion device such as a fuel cell or a combination of a fuel cell and an electric motor.

The battery 110 is coupled to the motor-generator 108 and stores electrical energy. The motor-generator 108 converts electrical energy from the battery 110 into driving torque and converts received torque into electrical energy to be stored by the battery 110.

The motor-generator 108 is coupled to the engine 106 via a shaft 120 and to the transmission 112 via a shaft 122. The driving torque generated by the motor-generator 108 may be transferred to the transmission 112. Similarly, the driving torque generated by the engine 106 can be received by the motor-generator 108 and/or may pass through the motor-generator 108 to be received by the transmission 112. The motor-generator 108 may also receive torque from the transmission 112 and convert the received torque to electrical energy.

The transmission 112 can be shifted between a plurality of gears. The transmission 112 receives torque from at least one of the engine 106 or the motor-generator 108 and transfers the received torque to the differential 114 via a shaft 124. The differential 114 transfers torque received from the transmission 112 to an axle 116 for driving wheels 118 of the vehicle 100.

Driving torque generated by the engine 106 and/or the motor-generator 108 may be applied to the wheels 118 via the axle 116, thus propelling the vehicle. When the transmission 112 is in a forward gear, the driving torque may cause the vehicle 100 to be propelled in a forward direction. When the transmission 112 is in a reverse gear, the driving torque may cause the vehicle 100 to be propelled in an aftward direction.

In some embodiments, one or both of the engine 106 or the motor-generator 108 may also generate torque in a reverse direction. In these embodiments, the engine 106 or the motor-generator 108 made generate driving torque in the reverse direction for propelling the vehicle 100 in the aftward direction.

The brake 126 may be coupled to the axle 116. The brake 126 can be controlled to apply a braking torque to at least one of the axle 116, one or more wheels 118 or any other rotating element of the vehicle 100. The brake 126 may include any brake known in the art and usable by a vehicle. For example, the brake 126 may include a hydraulic brake, a disk brake, an air brake or the like.

The braking torque applied by the brake 126 reduces the angular velocity of the axle 116 and/or the wheels 118 and thus reduces a speed of the vehicle 100. The brake 126 can be controlled to apply any amount of braking torque within a range of braking torques. The braking torque reduces the driving torque regardless of whether the vehicle 100 is moving in the forward direction or the aftward direction.

The ECU 102 may be electrically coupled to some or all of the components or devices of the vehicle 100. The ECU 102 can include one or more processors or controllers specifically designed for automotive systems, and the functions of the ECU 102 can be implemented in a single ECU or in multiple ECUs. The ECU 102 may receive data from components or devices of the vehicle 100, may determine data based on the received data and may control the operations of components or devices based on the received or determined data.

The memory 104 may include one or any combination of the following: a RAM or other volatile or nonvolatile memory, a non-transitory memory or a data storage device, such as a hard disk drive, a solid state disk drive, a hybrid disk drive, a remote cloud or other appropriate data storage device or system. The memory 104 may store machine-readable instructions executable by the ECU 102 and may store any other data as instructed by the ECU 102.

The speed sensor 128 may include any sensor capable of detecting data corresponding to a speed of the vehicle 100. For example, the speed sensor 128 may include a sensor that detects the speed of the vehicle 100. As another example, the speed sensor 128 may include an angular velocity sensor coupled to one or more of the wheels 118. When the speed sensor 128 does not directly detect the speed of the vehicle, such as the case with the angular velocity sensor, the ECU 102 may determine the speed of the vehicle 100 based on the data detected by the speed sensor 128.

The mass sensor 130 may include any sensor capable of detecting data that corresponds to a mass of the vehicle 100. For example, the mass sensor 130 may include a force sensor coupled to one or more shocks (not shown) of the vehicle 100. The ECU 102 may be coupled to the force sensor and use the data detected by the pressure sensor to determine the mass of the vehicle 100. In some embodiments, the mass sensor 130 may also or instead include a camera capable of detecting data corresponding to a number of passengers in the vehicle 100. The mass sensor 130 may also or instead include a force sensor coupled to one or more vehicle seats. This force sensor can detect the presence of passengers and/or detect data corresponding to the mass of the driver or passengers. In the latter two examples, the ECU 102 may estimate the mass of the vehicle 100 based on the detected number of passengers in the vehicle 100.

The traction detection device 132 may include any device or sensor capable of detecting data corresponding to a traction status of a surface on which the vehicle 100 is driving. For example, the traction detection device 132 may include a sensor coupled to one or more wheels 118 and designed to detect whether the corresponding wheel or wheels lose traction relative to the driving surface. In some embodiments, the ECU 102 may initiate stability control operations when the sensor detects that the wheels 118 lose traction relative to the driving surface.

As another example, the traction detection device 132 may include an input device (not shown) designed to receive a user request to initiate stability control operations. If the stability control operations have been initiated using the input device then the ECU 102 may determine that the traction on the current road is relatively low.

In some embodiments, the vehicle 100 may not include some of the components or devices described above with reference to FIG. 1. For example, the vehicle 100 may not include one or both of the mass sensor 130 or the traction detection device 132. In some embodiments, the vehicle 100 may include additional components or devices that may be used to assist in improving the smoothness of a stopping event. For example, the vehicle 100 may include an inertial measurement unit (IMU) 138 instead of or in addition to the mass sensor 130 or the traction detection device 132. The IMU 138 may include an accelerometer, a gyroscope or the like and may detect an acceleration or inertial movement of the vehicle 100.

The accelerator pedal 134 and the brake pedal 136 may be input devices usable by a driver for accelerating or decelerating, respectively, the vehicle 100. If the driver depresses the accelerator pedal 134 then the ECU 102 may control at least one of the engine 106 or the motor-generator 108 to increase an output of the driving torque. The increased driving torque results in acceleration of the vehicle 100. If the driver releases the accelerator pedal 134 then the ECU 102 may control at least one of the engine 106 or the motor-generator 108 to decrease the output of the driving torque.

If the driver depresses the brake pedal 136 then the ECU 102 may control the brake 126 to increase an amount of braking torque applied to the axle 116. This increased braking torque results in deceleration of the vehicle 100.

In some embodiments, if the driver depresses the brake pedal then the ECU 102 may also or instead control the motor-generator 108 to switch to a regenerative braking mode. When in the regenerative braking mode, the motor-generator 108 receives torque via the shaft 122 and converts the received torque into electrical energy. This conversion of torque reduces the driving torque and decelerates the vehicle 100.

Figure 2:
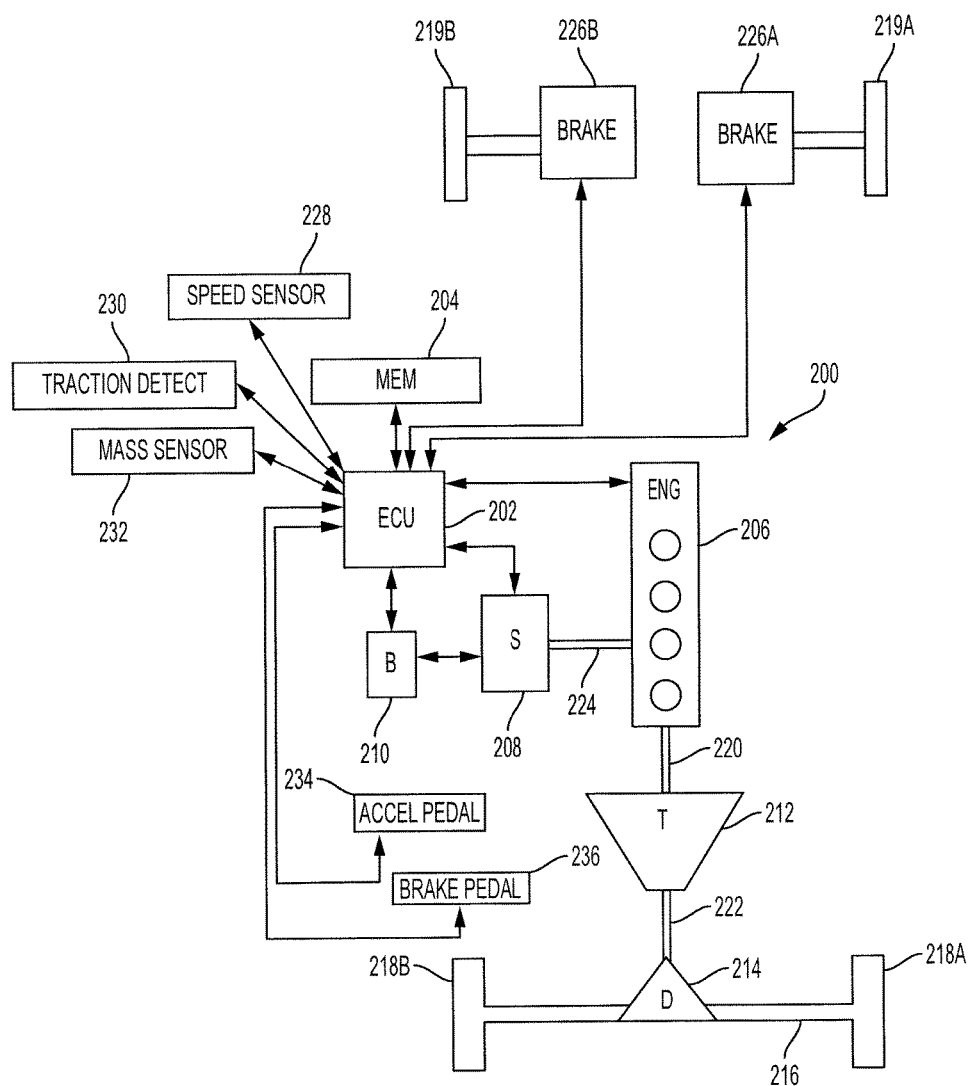
FIG. 2 is a block diagram of another vehicle having components for controlling braking to reduce oscillations upon a vehicle stop according to an embodiment of the present invention.

Turning now to FIG. 2, another vehicle 200 includes similar features as the vehicle 100 of FIG. 1. The vehicle 200, however, is a standard vehicle whereas the vehicle 100 of FIG. 1 is a hybrid vehicle. Thus, the vehicle 200 includes an engine 206 but does not include a motor-generator.

The engine 206 is coupled to a transmission 212 via a shaft 220. The transformer is coupled to a differential 214 via a shaft 222. The driving torque generated by the engine 206 is applied to an axle 216 via the transmission 212 and the differential 214. The driving torque causes front wheels 218 to rotate, thus propelling the vehicle 200 in a forward direction. When the transmission 212 is in a reverse gear, the driving torque generated by the engine 206 causes the axle 216 to rotate in the reverse direction, thus causing the vehicle 200 to move in the reverse direction.

The engine 206 is coupled to a starter motor 208. The starter motor 208 is coupled to a battery 210. The starter motor 208 can convert electrical energy from the battery 210 to torque. The torque generated by the starter motor 208 is applied to the engine 206 and is used to start the engine 206. In some embodiments, the torque generated by the starter motor 208 may also be applied through the engine 206 and received as driving torque by the axle 216.

The vehicle 200 includes rear wheels 219 including a first rear wheel 219A and a second rear wheel 219B. The rear wheels 219 are not coupled to the engine 206 and thus do not receive any driving torque from the engine 206 or the starter motor 208. The rear wheels 219 are coupled to brakes 226. In particular, the first rear wheel 219A is coupled to a first brake 226A and the second rear wheel 219B is coupled to a second brake 226B.

The brakes 226 may be controlled to apply a braking torque to the rear wheels 219. The braking torque applied by the brakes 226 to the rear wheels 219 at least partially offsets the driving torque applied to the front wheels 218. Furthermore, the driving torque applied to the front wheels 218 at least partially reduces or offsets the braking torque applied to the rear wheels 219.

Referring now to FIGS. 1 and 2, the ECU 102 and the ECU 202 are designed to perform controlled braking operations. The controlled braking operations effectively reduce oscillations caused when a vehicle comes to a stop. The oscillation reduction is achieved by reducing or offsetting the braking torque applied to the vehicle as the vehicle is coming to a stop. For example, the ECU 102 may receive data from the various sensors such as the speed sensor 228, the traction detection device 230, the mass sensor 232, the accelerator pedal 234 and/or the brake pedal 236.

Based on this data, the ECU 102 may determine whether controlled braking of the vehicle 100 should occur. If so, the ECU 102 may control the brake 126 to reduce the applied braking torque and/or may control at least one of the engine 106 or the motor-generator 108 to increase the driving torque to offset the braking torque. In some embodiments, the ECU 102 may also or instead control the starter motor 208 to increase the driving torque to offset the braking torque.

This reduction or offset of the braking torque is preferably applied when the vehicle speed is relatively low, such as below one mile-per-hour (mph). When the braking torque is reduced due to controlled braking, the deceleration of the vehicle 100 is reduced. Thus, the momentum of the vehicle 100 will be reduced when the vehicle 100 comes to a complete stop. The reduced momentum results in less force applied to the tires in the forward direction. The tires will have less deformation because the vehicle momentum is reduced and, thus, the oscillations will be reduced in magnitude or eliminated.

The reduced deceleration provides advantages in addition to the reduced oscillations. Because the deceleration of the vehicle is reduced, the driver and the passengers will have less momentum when the vehicle stops. This reduced momentum of persons will result in the persons experiencing less sensation of being "jerked" forward when the vehicle stops.

Figure 3:
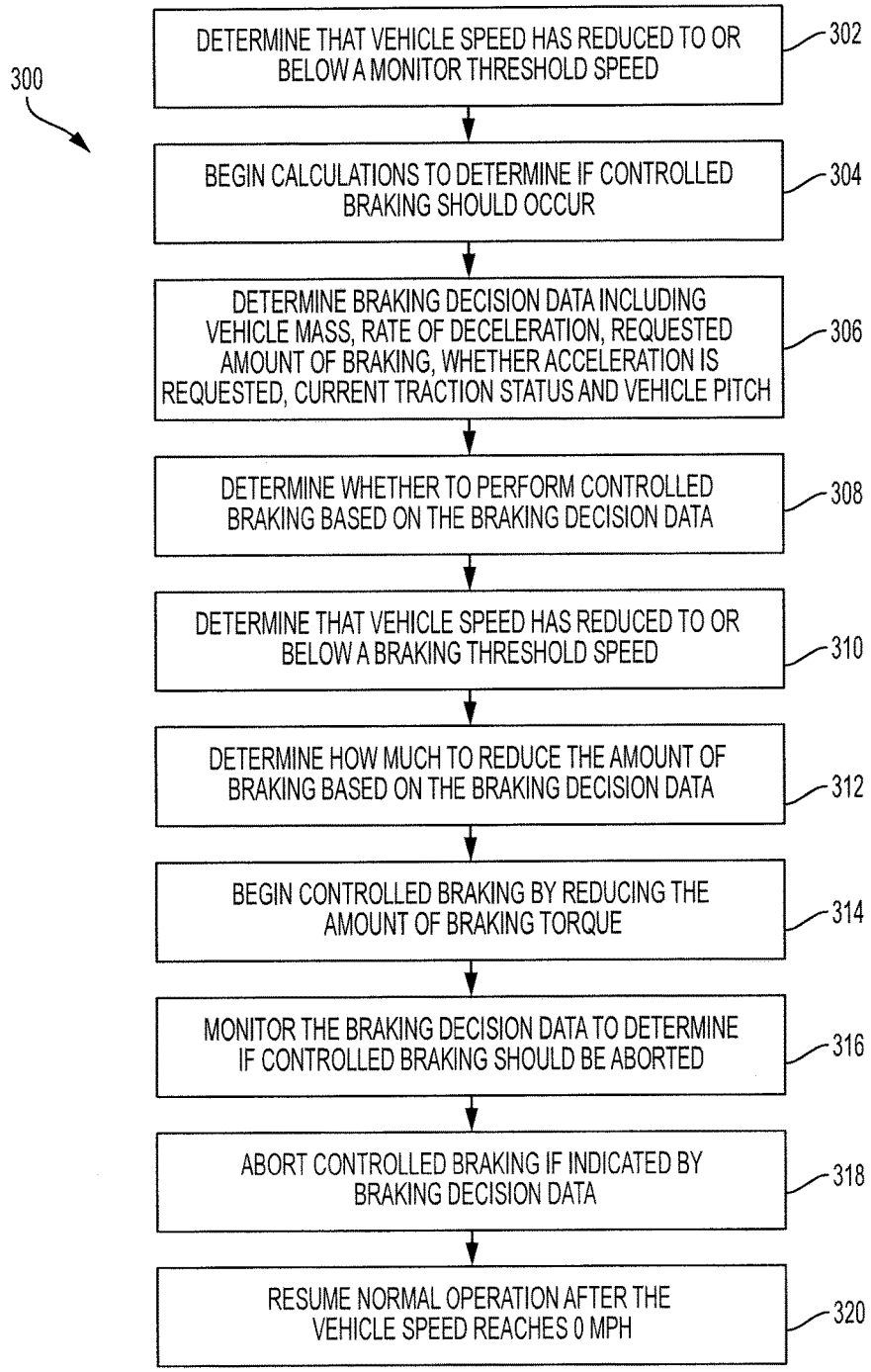
FIG. 3 is a flowchart showing a method for controlling braking to reduce oscillations upon a vehicle stop according to an embodiment of the present invention.

Turning now to FIG. 3, a method 300 for controlled braking by a vehicle is shown. The method 300 may be performed by components of a vehicle such as the vehicle 100 of FIG. 1 or the vehicle 200 of FIG. 2. The method 300 is applicable regardless of whether the vehicle is traveling forward or aftward.

The method 300 begins at block 302 where an ECU of the vehicle determines that the vehicle speed is reduced to or below a monitor threshold speed. The monitor threshold speed corresponds to a speed below which it may be likely that the vehicle will come to a stop. The monitor threshold speed may be, for example, 10 mph, 5 mph, 2 mph or the like.

When the vehicle speed reaches or is below the monitor threshold speed, the ECU will begin to monitor data detected by the sensors of the vehicle to determine whether or not to start controlled braking. Thus, in block 304 the ECU may begin analyzing the detected data to determine if controlled braking should occur.

The detected data may include braking decision data, such as the mass of the vehicle, the rate of deceleration of the vehicle, a requested amount of braking received from the brake pedal, whether acceleration is received via the accelerator pedal, a current traction status, a current vehicle pitch, acceleration data from the IMU or the like.

The braking decision data may be determined by the ECU in block 306. For example, the ECU may determine the braking decision data by receiving each piece of data from a sensor. In some embodiments, the ECU may perform calculations based on the received data to determine a particular braking decision data. For example, the ECU may receive the speed of the vehicle from a speed sensor. By monitoring the speed of the vehicle over a period of time, the ECU may determine the rate of deceleration or the rate of acceleration.

In block 308, the ECU determines whether to perform controlled braking based on the braking decision data. When controlled braking is active, the ECU controls some aspects of the vehicle's braking. It is desirable for the controlled braking algorithm to have failsafe mechanisms in place so that the controlled braking is always performed in a safe manner. The failsafe mechanisms are based on the braking decision data and can result in termination of an instance of controlled braking.

When controlled braking is being performed, the braking torque of the vehicle is reduced. It is undesirable for controlled braking to be performed when the vehicle is decelerating at a rapid rate as the controlled braking may reduce the likelihood of the vehicle stopping at a desired stopping location. Thus, the ECU determines whether controlled braking should be performed based on the current rate of deceleration of the vehicle.

If the current rate of deceleration of the vehicle is greater than a threshold deceleration rate then the controlled braking will not be performed. The threshold deceleration rate may correspond to a deceleration rate above which the vehicle may not stop within a certain distance of the desired stop point if controlled braking is implemented. For example, if the deceleration rate is greater than the threshold deceleration rate and controlled braking is implemented, the vehicle may come to a stop at a point 5 feet past the desired stopping location.

In some embodiments, the ECU determines whether controlled braking should be performed based on the mass of the vehicle and the current rate of deceleration. The greater the mass of the vehicle, the more momentum the vehicle will have and thus the more torque will be required to stop the vehicle. In order to compensate for this, the threshold deceleration rate may be adjusted based on the mass of the vehicle. For example, as the vehicle mass increases, the threshold deceleration rate may decrease.

The ECU may also determine whether controlled braking should be performed based on a requested amount of braking. For example, the ECU may compare the requested amount of braking to a braking threshold. The braking threshold is a threshold below which the ECU may assume that the driver is attempting a normal stop.

When the requested amount of braking is greater than the braking threshold, the ECU may assume that the driver is attempting to come to a stop relatively quickly. When the driver is attempting to stop relatively quickly or rapidly, it is undesirable to reduce the amount of braking because the driver may have a good reason for requesting the quick stop. For example, the driver may request a relatively large amount of braking in order to avoid hitting another stopped vehicle. Thus, controlled braking may not be performed when the driver is requesting a relatively large amount of braking. However, when the requested amount of braking is less than or equal to the braking threshold, the ECU may assume that the driver is attempting a normal stop and controlled braking may be performed.

The ECU may also determine whether controlled braking should be performed based on whether acceleration is requested by the driver. An acceleration request likely corresponds to a driver's intention to stop braking or not perform braking. Thus, if acceleration is requested, the driver is likely not coming to a stop and controlled braking may not be performed.

The ECU may also determine whether controlled braking should be performed based on a current traction status of the vehicle. If the current traction of the vehicle is below a traction threshold then the ECU may determine that controlled braking should not be performed. The traction threshold corresponds to an amount of traction below which the vehicle is likely to slide on the driving surface. For example, the traction threshold may correspond to an amount of traction below which stability control operations of the vehicle will become activated. Because stability control operations provide safety functions for the vehicle in low traction situations, it is undesirable for these functions to be interrupted. Even if the stability control operations are not activated, it may still be undesirable for automatic braking to occur as it may interfere with the driver's ability to drive on the low traction service. Thus, automatic braking may not occur when the amount of traction is less than the traction threshold.

The ECU may also determine whether controlled braking should be performed based on the current vehicle pitch. The vehicle pitch corresponds to an angle of the vehicle's heading relative to the horizon and indicates a grade of a road upon which the vehicle is traveling. When the vehicle pitch is greater than a predetermined angle and the vehicle is traveling downhill (i.e., the vehicle is heading below the horizon), the vehicle may be unable to come to a stop within a reasonable distance if the braking torque is reduced or offset. The predetermined angle corresponds to an angle in the downhill direction above which the vehicle may not come to a stop without braking torque applied. Thus, automatic braking may not occur when the vehicle pitch is greater than the predetermined angle and the vehicle is traveling downhill.

If the ECU determines to provide controlled braking, it may only do so when the speed of the vehicle has reduced to or below a braking threshold speed. Thus, in block 310, the ECU may determine when the vehicle speed has reduced to or below the braking threshold speed.

The braking threshold speed corresponds to a speed below which reduction of braking torque is unlikely to affect the braking operation. For example, if the braking torque is reduced when the vehicle speed is above the braking threshold speed, the vehicle may not stop until a relatively large distance has been traveled past the desired stopping location. However, if the braking torque is reduced when the vehicle speed is at or below the braking threshold speed, the vehicle may come to a complete stop at some point relatively near the desired stopping location.

In some embodiments, the braking threshold speed may be a predetermined speed, such as 1 mph (1.61 kilometers per hour (kph)), 2 mph (3.22 kph), 3 mph (4.83 kph) or the like. In some embodiments, the ECU determines the braking threshold speed based on the braking decision data. For example, the ECU may set the braking threshold speed for a vehicle having a relatively low deceleration rate at a higher speed than a vehicle having a relatively high deceleration rate. As another example, the ECU may set the braking threshold speed for a vehicle having a lesser mass at a higher speed than a vehicle having a greater mass.

In block 312, after the ECU determines that the vehicle will perform controlled braking, the ECU may determine how much to reduce or offset the amount of braking torque based on the braking decision data. The ECU may perform calculations to determine this information using braking decision data as an input. Any of a number of calculations may be performed by the ECU to determine how much to reduce or offset the braking. For example, the ECU may determine the amount based on the mass of the vehicle and the current rate of deceleration of the vehicle.

In some embodiments, the ECU may be designed to reduce or offset the braking torque by a similar amount regardless of the braking decision data. For example, the ECU may be designed to always reduce or offset the braking torque by 44.25 inch-pounds (5 Newton meters).

In block 314, the ECU may begin controlled braking by reducing or offsetting the amount of braking torque by the amount determined in block 312. For example and referring to FIG. 2, the ECU 202 may reduce the amount of braking torque applied to one or more wheels by directly controlling one or both of the first brake 226A or the second brake 226B to apply less braking torque. The ECU 202 may also or instead offset the braking torque by controlling the starter motor 208 to generate driving torque. The driving torque will be applied to the axle 216 and will offset the braking torque generated by the brakes 226.

As another example and referring to FIG. 1, the ECU 102 may reduce the amount of braking torque by controlling the brake 126 to apply less braking torque and/or may offset the amount of braking torque by controlling the motor-generator 108 to generate driving torque.

In some embodiments, the motor-generator 108 may be designed to perform regenerative braking. In that regard, the motor-generator 108 may convert torque received via the shaft 122 into electrical energy for storage in the battery 110. This is considered a braking operation because it reduces driving torque on the axle 116. In these embodiments, the ECU 102 may also or instead offset the braking torque by reducing regenerative braking by the motor-generator 108. When the amount of torque converted by the motor-generator 108 is reduced, the total braking torque on the axle 116 is reduced.

Figure 4:
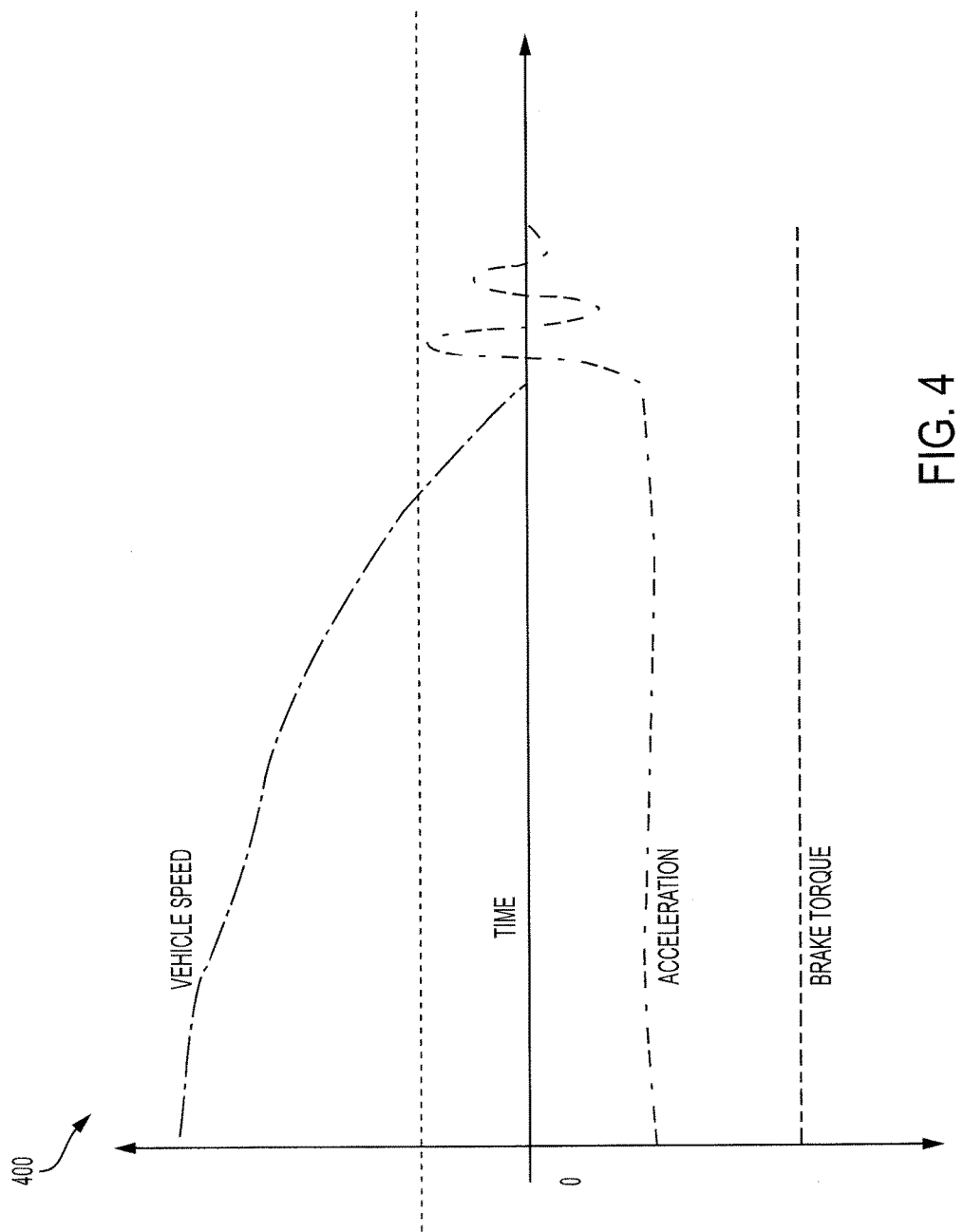
FIG. 4 is a chart illustrating the oscillation effect caused by a vehicle stop without controlled braking according to an embodiment of the present invention.

Turning to FIG. 4, a chart 400 shows a speed, an acceleration and a braking torque of a vehicle over a period of time. The chart 400 corresponds to a braking operation of a vehicle that is not using controlled braking. As shown, the braking torque is a constant value and continuously reduces a driving torque. The constant braking torque applied results in a constant deceleration of the vehicle as the vehicle speed reduces.

When the vehicle speed reaches 0 mph, the momentum of the vehicle causes the tires of the vehicle to deform and allows the body of the vehicle to move forward relative to the tires. After the tires have stopped deforming, the resiliency of the tires causes them to return towards their original shape. This return of the tires to their original shape forces the body of the vehicle to move in an aft direction relative to the tires, creating aftward momentum of the vehicle. This aftward momentum again deforms the tires such that the vehicle moves aft relative to the tires. This repetitive deformation and reformation of the tires results in oscillation of the vehicle. This oscillation is shown by the acceleration on the chart 400 which periodically increases and decreases after the vehicle speed reaches 0 mph.

Figure 5:
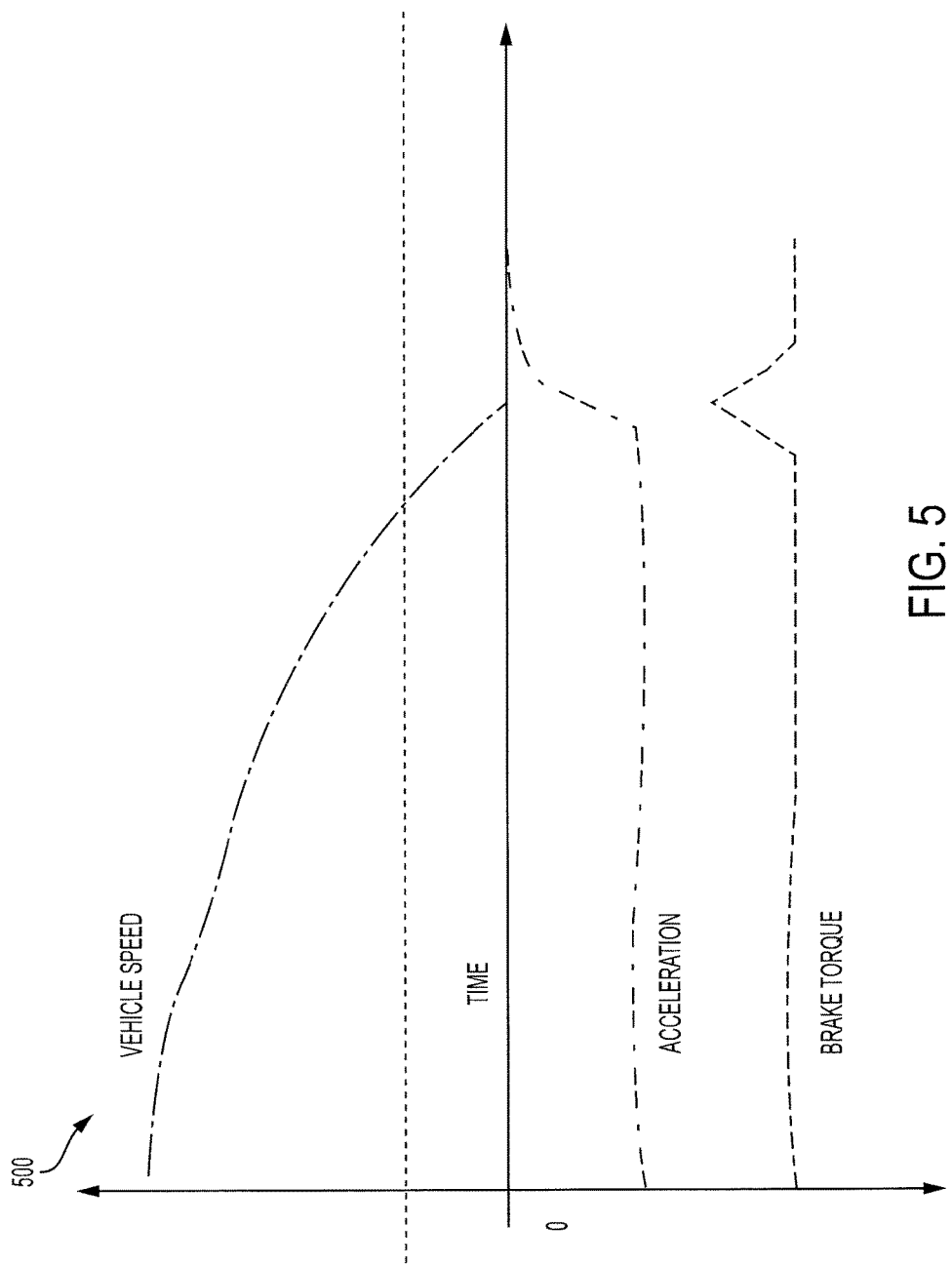
FIG. 5 is a chart illustrating reduced vehicle oscillation during a stop as a result of use of controlled braking according to an embodiment of the present invention.

Turning now to FIG. 5, a chart 500 shows a speed, an acceleration and a braking torque of a vehicle over a period of time. The chart 500 corresponds to a braking operation of the vehicle using controlled braking. In the beginning of the braking operation, the braking torque, and thus deceleration of the vehicle, is relatively constant. Shortly before the vehicle speed reaches 0 mph, the brake torque of the vehicle is reduced or offset. This reduction of braking torque results in the rate of deceleration of the vehicle decreasing more gradually than if the braking torque were not reduced or offset.

Due to the gradual decrease in the rate of deceleration of the vehicle, the vehicle will have less momentum as the vehicle speed approaches 0 mph. The reduced momentum may be insufficient to cause the tires to default and, thus, the vehicle will not oscillate upon stopping. After the vehicle has come to a complete stop, the brake torque may return to its pre-controlled braking level.

In some embodiments, the vehicle momentum may be sufficiently great after controlled braking that the tires experience some deformation such that some oscillation occurs. However, this oscillation is reduced relative to a situation in which controlled braking is not performed.

As shown, the brake torque is decreased and subsequently increased gradually as opposed to instantaneously. This gradual decrease and increase may potentially reduce or eliminate any unnecessarily abrupt changes in acceleration relative to an instantaneous change in brake torque, thus further improving driver comfort. In some embodiments, however, the brake torque may be decreased and/or increased instantaneously instead of gradually.

Returning now to FIG. 3 and after controlled braking has begun in block 314, failsafe mechanisms may be in place to stop controlled braking if it is no longer desirable.

In block 316, the ECU may continue to monitor the braking decision data to determine if controlled braking should be aborted or terminated. For example, if a driver requests acceleration during controlled braking, the driver is no longer likely to stop. In this situation, the ECU may determine that controlled braking should be aborted so that the driver can have complete control for driving operations. As another example, if a requested amount of braking is increased, a driver may be attempting to stop at a location closer than the original desired stop location. In this situation, it is also undesirable for controlled braking to occur. This is because controlled braking reduces an amount of braking torque which is undesirable while the driver is requesting additional braking torque.

As yet another example, vehicle pitch may change from location to location. Thus, as a driver is coming to a stop, the vehicle pitch may increase to a point beyond the predetermined angle. In this situation, this may be undesirable for controlled braking to occur as the vehicle may be unable to stop with the reduced or offset braking torque resulting from controlled braking. Thus, the ECU may determine the controlled braking should be aborted in this situation.

In some embodiments, the ECU may also determine whether to adjust the amount of offset or reduction in braking torque based on the braking decision data. For example, the ECU may determine to adjust an amount of braking that is offset based on acceleration data detected by the IMU.

In block 318, if the braking data indicates that controlled braking should be aborted, the ECU will abort the controlled braking. In order to do so, the ECU ceases to reduce the braking torque and/or increase the driving torque and allows normal operation of the vehicle to resume.

In block 320, if controlled braking is not aborted, the ECU may stop controlled braking and resume normal operation of the vehicle after the vehicle speed reaches 0 mph. In some embodiments, the ECU may be designed to allow controlled braking to continue for a period of time after the vehicle speed reaches 0 mph. This reduces the likelihood of early termination of controlled braking that may occur if the speed sensor is not properly calibrated.

In some embodiments, the ECU may have the capability to learn and improve the controlled braking functionality as data is detected during controlled braking events. For example, every time the ECU performs controlled braking, the ECU may store the braking decision data detected prior to and during the controlled braking. The ECU may also receive acceleration data from the IMU for a period of time prior to and/or after the vehicle has come to rest. The acceleration data can provide an indication of the amount of oscillation that occurred during the controlled braking stop. The ECU can use this data to adjust parameters during a subsequent controlled braking event to further reduce the oscillations.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for reducing oscillations when a vehicle is braking, the system comprising:
    a speed sensor configured to detect speed data corresponding to a speed of the vehicle;
    a mass sensor configured to detect mass vehicle data corresponding to a mass of the vehicle;
    a motor configured to convert electrical energy into driving torque;
    a first wheel coupled to the motor and configured to propel the vehicle in response to receiving the driving torque;
    a second wheel;
    a brake coupled to at least one of the first wheel or the second wheel and configured to apply a braking torque to the at least one of the first wheel or the second wheel to reduce the speed of the vehicle; and
    an electronic control unit (ECU) coupled to the speed sensor, the mass sensor, and the motor, and configured to determine to apply controlled braking based on the mass of the vehicle, and to control the motor to begin the controlled braking by applying the driving torque to the first wheel to at least partially offset the braking torque in response to determining to apply the controlled braking and the speed of the vehicle reaching or dropping below a braking threshold speed.

2. The system of claim 1 wherein the ECU is further configured to control the motor to apply the driving torque to the first wheel until the speed of the vehicle is zero miles per hour (0 mph).

3. The system of claim 1 wherein the braking threshold speed corresponds to a vehicle speed below which reduction of the braking torque is unlikely to affect a braking operation and corresponds to a value between 0.5 miles per hour (0.5 mph) and 3 mph.

4. The system of claim 1 further comprising:
    a brake pedal coupled to the ECU and configured to transmit a signal to the ECU indicating that a braking operation is being requested in response to being depressed; and
    an accelerator pedal coupled to the ECU and configured to transmit a signal to the ECU indicating that an acceleration operation is being requested in response to being depressed,
    wherein the ECU is further configured to control the motor to stop controlled braking when at least one of the brake pedal is undepressed or the accelerator pedal is depressed.

5. The system of claim 1 further comprising a traction sensor configured to detect or receive data corresponding to a current amount of traction of the at least one of the first wheel or the second wheel, wherein the ECU is further configured to prevent the controlled braking when the current amount of traction of the at least one of the first wheel or the second wheel is below a traction threshold.

6. The system of claim 1 further comprising a brake pedal coupled to the ECU and configured to transmit a signal to the ECU indicating a desired amount of braking in response to being depressed, wherein the ECU is further configured to determine whether to begin controlled braking based on at least one of a rate of deceleration of the vehicle or the desired amount of braking.

7. The system of claim 6 wherein the ECU is further configured to determine an amount of the driving torque to be applied by the motor based on at least one of the rate of deceleration of the vehicle, the desired amount of braking or the mass of the vehicle.

8. A method for reducing oscillations when a vehicle is braking comprising:
    detecting, by a speed sensor, speed data corresponding to a speed of the vehicle;
    detecting, by a mass sensor, mass vehicle data corresponding to a mass of the vehicle;
    determining, by an electronic control unit (ECU), to apply controlled braking based on the mass of the vehicle; and
    controlling, by the ECU, a motor of the vehicle to reduce or offset an amount of braking torque of the vehicle in response to determining to apply the controlled braking and the speed of the vehicle reaching or dropping below a braking threshold speed.

9. The method of claim 8 wherein controlling the motor of the vehicle to reduce or offset the amount of braking torque of the vehicle includes controlling, by the ECU, the motor of the vehicle to increase driving torque of the vehicle to offset the amount of braking torque of the vehicle.

10. The method of claim 8 wherein controlling the motor of the vehicle to reduce or offset the amount of braking torque of the vehicle includes controlling the motor of the vehicle to reduce or offset the amount of braking torque of the vehicle until the speed of the vehicle is 0 miles per hour (mph).

11. The method of claim 8 wherein the braking threshold speed corresponds to a vehicle speed below which reduction of the braking torque is unlikely to affect a braking operation.

12. The method of claim 8 further comprising determining, by the ECU, how much the amount of braking torque is to be reduced or offset based on at least one of a rate of deceleration of the vehicle, a desired amount of braking or the mass of the vehicle.

13. A system for reducing oscillations when a vehicle is braking comprising:
   a speed sensor configured to detect speed data corresponding to a speed of the vehicle;
   a mass sensor configured to detect mass vehicle data corresponding to a mass of the vehicle;
   a motor configured to convert electrical energy into driving torque to propel the vehicle;
   at least one wheel configured to support the vehicle on a ground surface;
   a brake coupled to the at least one wheel and configured to apply a braking torque to the at least one wheel to reduce the speed of the vehicle; and
   an electronic control unit (ECU) coupled to the speed sensor, the mass sensor, and the motor, and configured to determine to apply controlled braking based on the mass of the vehicle, and to control the motor to begin the controlled braking by applying the driving torque to the at least one wheel to at least partially offset the braking torque in response to the speed of the vehicle reaching or dropping below a braking threshold speed.

14. The system of claim 13 wherein the ECU is further configured to control the motor to apply the driving torque to the at least one wheel until the speed of the vehicle is zero miles per hour (0 mph).

15. The system of claim 13 wherein the braking threshold speed corresponds to a vehicle speed below which reduction of the braking torque is unlikely to affect a braking operation and corresponds to a value between 0.5 miles per hour (0.5 mph) and 3 mph.

16. The system of claim 13 further comprising:
   a brake pedal coupled to the ECU and configured to transmit a signal to the ECU indicating that a braking operation is being requested in response to being depressed; and
   an accelerator pedal coupled to the ECU and configured to transmit a signal to the ECU indicating that an acceleration operation is being requested in response to being depressed,
   wherein the ECU is further configured to control the motor to stop controlled braking when at least one of the brake pedal is undepressed or the accelerator pedal is depressed.

17. The system of claim 13 further comprising a traction sensor configured to detect or receive data corresponding to a current amount of traction of the at least one wheel, wherein the ECU is further configured to prevent the controlled braking when the current amount of traction of the at least one wheel is below a traction threshold.

18. The system of claim 13 further comprising a brake pedal coupled to the ECU and configured to transmit a signal to the ECU indicating a desired amount of braking in response to being depressed, wherein the ECU is further configured to determine whether to begin controlled braking based on at least one of a rate of deceleration of the vehicle or the desired amount of braking.

19. The system of claim 18 wherein the ECU is further configured to determine an amount of the driving torque to be applied by the motor based on at least one of the rate of deceleration of the vehicle, the desired amount of braking or the mass of the vehicle.

20. The system of claim 13 wherein the at least one wheel includes a first wheel coupled to the motor and configured to receive the driving torque and to propel the vehicle in response to receiving the driving torque.

* * * * *